(12) United States Patent
Luerkens

(10) Patent No.: US 6,472,844 B2
(45) Date of Patent: Oct. 29, 2002

(54) SINGLE-PHASED POWERED DRIVE SYSTEM

(75) Inventor: Peter Luerkens, Aachen (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/811,726

(22) Filed: Mar. 19, 2001

(65) Prior Publication Data

US 2001/0035731 A1 Nov. 1, 2001

(30) Foreign Application Priority Data

Mar. 21, 2000 (DE) .......................................... 100 13 692

(51) Int. Cl.$^7$ ............................................... H02P 1/26
(52) U.S. Cl. .................. 318/768; 318/781; 318/809
(58) Field of Search ................................. 318/768, 781, 318/798, 800, 801, 803, 807, 809, 811

(56) References Cited

U.S. PATENT DOCUMENTS

| | | | | |
|---|---|---|---|---|
| 4,328,454 A | * | 5/1982 | Okuyama et al. | 318/803 |
| 5,146,146 A | * | 9/1992 | Samann | 318/778 |
| 5,420,492 A | * | 5/1995 | Sood et al. | 318/809 |
| 5,471,125 A | * | 11/1995 | Wu | 318/803 |
| 5,576,606 A | * | 11/1996 | Phuoc et al. | 318/801 |
| 5,734,250 A | * | 3/1998 | Lindmark | 318/801 |
| 6,107,773 A | * | 8/2000 | Lurkens | 318/801 |
| 6,166,929 A | * | 12/2000 | Ma et al. | 363/37 |

FOREIGN PATENT DOCUMENTS

| | | |
|---|---|---|
| DE | 19729705 A1 | 1/1999 |
| EP | 0489970 A1 | 6/1992 |
| EP | 0711470 B1 | 10/1999 |

OTHER PUBLICATIONS

Mohan et al, *Power Electronics: Converters, Applications, and Design* (Dec. 1989) pp. 414–425.

* cited by examiner

*Primary Examiner*—Robert E. Nappi
*Assistant Examiner*—Rina I. Duda
(74) *Attorney, Agent, or Firm*—Ernestine C. Bartlett

(57) ABSTRACT

A drive system including a rectifier, a high-frequency filter, a static inverter and an induction motor is driven without energy stores and fed by the single-phase mains, in which the use of an envelope generator with a mains-synchronous, preferably sinusoidal signal causes a preferably sinusoidal envelope to be sign-superimposed on the static inverter output signal, thus preventing inadmissible current overshoots in the single-phase mains. Possible fluctuations of the intermediate circuit voltage are thereby compensated. The advantageous operating frequency of the static inverter may be adjusted automatically by a PLL control circuit in that the phase shift between intermediate current and the envelope signal is evaluated. The advantageous operating frequency may be gained by adding a given frequency difference to the rotational speed of the motor. The envelope directly represents a projection of the variation of the voltage of the single-phase mains.

19 Claims, 5 Drawing Sheets

SINGLE-PHASED POWERED DRIVE SYSTEM

The AC universal motor has been used for a long time as the most widely used motor in small domestic appliances and electric devices powered by the single-phase mains. Although it has a number of drawbacks, such as a short lifetime, poor quality of operation, and loud noise, it is widely used because of its low cost.

For some time, solutions with electronically commutated motors have been proposed, which, however, have not come into use due to their higher cost price. The drawback of a higher cost price is caused by the required power electronics, which converts a DC source into a three-phase current system for which it requires a plurality of power conductors (generally six). Moreover, a quite substantial number of additional components is required in that a further power-electronic circuit (generally an up-converter) is required so as to keep the overshoot of the mains input current below legally required limit values. This circuit comprises further power-electronic components such as an expensive electrolytic capacitor. This part of the circuit covers approximately one third of the overall costs.

A known method of powering asynchronous motors without energy stores uses a direct changer (Sämann, EP 0 489 970, FIG. 9). In this method, however, the output frequency of the static inverter is limited to approximately ⅓ of the mains frequency. The method is thus not suitable for drives with rotational speeds of more than 950 min-1.

A further method shown in FIG. 5 of the drawing and described in "Undeland, Mohan, Robbins: Power Electronics: Converters applications and design, Wiley & Sons, 1989, pp. 415 etc." uses an up-converter for supplying a high, approximately constant intermediate circuit voltage which can be supplied to a static inverter. Simultaneously, the mains input current is controlled in such a way that a substantially sinusoidal current is obtained. This circuit also comprises an energy store (21, usually an electrolytic capacitor), a semiconductor switch (17), a power choke (19) and a high-frequency diode (18). This method is universally usable but has the drawback of higher costs.

A method is known from DE 19729705 in which the intermediate circuit capacitor and a special phase switch of the static inverter achieves an effect which is seemingly similar to the effect achieved by the present invention. The associated circuit arrangement is shown in FIG. 7. In this method, it is, however, impossible to reduce the power arbitrarily because then this phase switch takes place when the intermediate circuit capacitor has not been discharged yet. This results in unacceptably high currents in the static inverter, except in high-speed motors with a sufficiently high spread. Consequently, the method is not suitable for low speeds and for drives whose power is adjustable within wide ranges.

In a further method known from EP 0 711 470 and shown in FIG. 6, the phase switching as described in DE 19729705 is dispensed with and, instead, a frequency modulation is utilized so as to operate the drive suitably. However, mains current oscillations, which are unwanted in the mains zero crossing, may then still occur, causing the harmonic limits to be exceeded at average power. Their use is limited to high-speed drives having a power which must not decrease below a minimum value during operation.

Further methods are known in which it is achieved by means of a special arrangement of diodes and storage capacitors (for example, "Valley-fill" circuit shown in FIG. 8) that, in spite of a storage capacitor in the intermediate circuit, there flows a current during a comparatively large part of the mains period. These circuits mainly influence the angle of current flow in the mains. However, it is not possible to reduce the mains current harmonic content sufficiently enough to allow use of drives having an average and a high power.

The drive system according to the invention comprises a rectifier, a high-frequency filter, a static inverter and an induction motor, is driven without energy stores and fed by the single-phase mains, in which the use of an envelope generator with a mains-synchronous, preferably sinusoidal signal causes a preferably sinusoidal envelope to be sign-superimposed on the static inverter output signal, thus preventing inadmissible current overshoots in the single-phase mains. Possible fluctuations of the intermediate circuit voltage are thereby compensated.

In further embodiments of the invention, the advantageous operating frequency of the static inverter is adjusted automatically by means of a PLL control circuit in that the phase shift between the intermediate circuit current and the envelope signal is evaluated.

In a further embodiment of the invention, the advantageous operating frequency is gained by adding a given frequency difference to the rotational speed of the motor.

In further embodiments of the invention, the envelope directly represents a projection of the variation of the voltage of the single-phase mains.

The present invention relates to a method of advantageously driving an induction or asynchronous motor in its overall speed range from the single-phase mains so that the harmonic content of the mains input current of the circuit remains below the admissible upper limits. Moreover, the drive can be arbitrarily adjusted in power. It is also possible to realize generator operation by means of an active mains rectifier. This provides the possibility of manufacturing electronically commutated speed-controlled drives at low cost for substantially any speed range and substantially any application. A principal limitation of the power range, as in all the other methods, is thereby eliminated. Drives up to the typical power limit of 3 kW of the single-phase mains can thus be realized.

Figure 1:
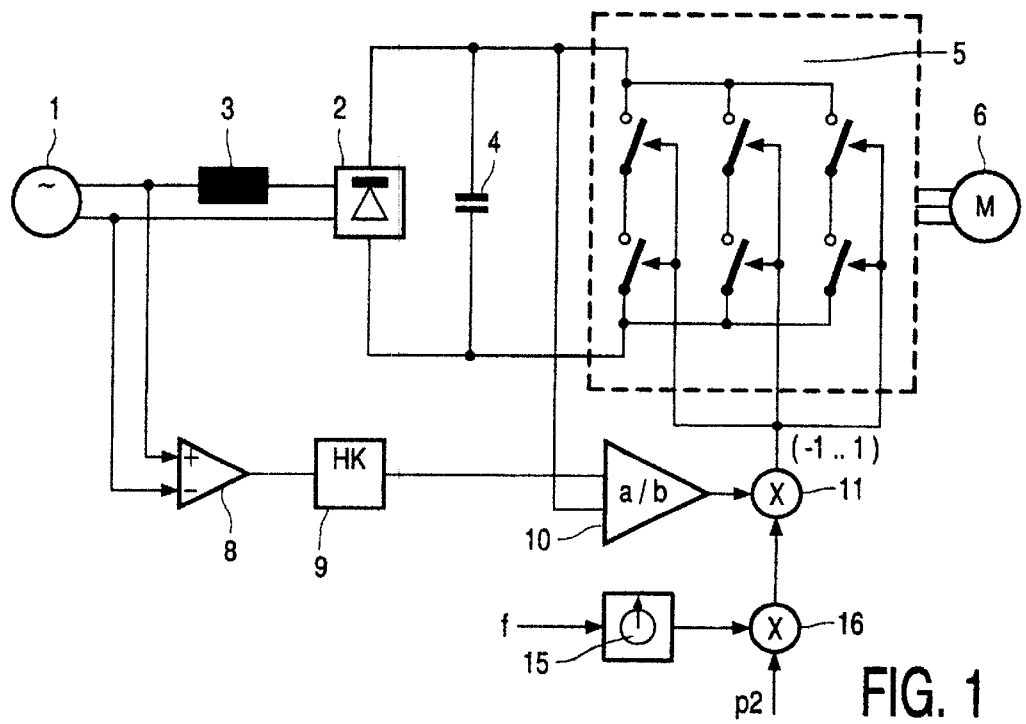
FIG. 1 shows an arrangement according to the invention, with a mains-synchronous generation of an arbitrary bipolar envelope, compensation of the effect of the intermediate circuit voltage changes on the resultant envelope and externally predetermined values for the frequency and power of the drive system.

FIG. 1 shows a preferred embodiment of a drive system according to the invention. A single-phase AC voltage source (1) constituted, for example, by the 50 Hz single-phase mains feeds a rectifier (2) via a choke (3) which is suitable and adapted to damp radio interference of the static inverter. Arranged at its output is a filter capacitor (4) which also serves in the first instance for damping the radio interference of the static inverter and must not fulfill a storage function. The filter capacitor may therefore be dimensioned to be small and at low cost. Connected to this capacitor is a preferably three-phase static inverter (5) which is connected to an asynchronous motor (6).

A modulator (15) generates a multi-phase system rotating at an adjustable frequency (f) and having an amplitude which can be changed in accordance with the type of pulse-width modulation. For adjusting the power of the drive system, both the frequency (f) and the amplitude of the modulator signal can be changed by means of a control parameter $P^2$ via an adjusting stage (15).

The embodiment shown in FIG. 1 further comprises a measuring stage (8) which is adapted to measure the voltage of the AC voltage source (1). The measuring stage (8) supplies a measuring value of the voltage of the AC voltage source (1) at its output. This measuring value may be a projection of the instantaneous value of the voltage of the AC voltage source (1) but supplies at least a signal comprising information about the sign of the voltage of the AC voltage source (1), i.e. about the mains voltage.

The output of the measuring stage (8) is connected to an input of an envelope generator HK (9) which is adapted to generate an envelope signal. This signal is supplied from an output of the envelope generator HK (9), which output is coupled to one of the inputs of a division stage (10). A second input of the division stage (10) is connected to the output of the rectifier (2); this second input receives the intermediate circuit voltage of the arrangement. An output of the division stage (10) for a quotient signal supplied by the division stage (10) is connected to an input of a first multiplication stage (11) whose second input is connected to the output of a second multiplication stage (16). Adjusting values, i.e. signals for adjusting the power—which in this case are signals for adjusting the frequency (f) as well as the amplitude of the modulator signal ($P^2$)—are combined with each other via the multiplication stages (11 and 16) and multiplicatively with the quotient signal for forming commutator signals for driving the static inverter (5). These commutator signals preferably optionally assume values from minus 1 to plus 1.

It is essential that the envelope curve generator HK (9) is controlled via a measurement of at least the sign of the mains voltage in the measuring stage (8), such that it generates the envelope signal, which is preferably a sine function, in a mains-synchronous manner. With this envelope and the instantaneous intermediate circuit voltage, a correction function is finally formed by means of a division in the division stage (10), with which function the amplitude of the modulator output signal is sign-multiplied in the first multiplication stage (11). A multiplication by a negative sign corresponds to a phase jump of 180 degrees of the static inverter output voltage. The envelope of the static inverter output voltage consequently corresponds to the variation predetermined by the envelope generator, and is independent of the actual variation of the intermediate circuit voltage. Since a correction is of course no longer possible when the intermediate circuit voltage is zero, this can only succeed when the predetermined envelope is constantly below the actual intermediate circuit voltage.

The frequency of the modulator and the rotational speed of the motor define the behavior of the static inverter input current of the static inverter (5), while particularly a temporal shift between current and voltage can thereby be influenced. In the case of a correct choice of the frequency (f) in dependence upon the rotational speed of the motor, it can be achieved that current and voltage at the static inverter input are in phase, which is generally desirable. For an advantageous control of the drive system, the adjusting values for the frequency (f) and the power (adjusting value $P^2$) of the drive system may be computed, for example, by a microcontroller. Manual adjustment is, however, also possible.

When the mains frequency and the static inverter output frequency are substantially equal, an envelope is of course no longer recognizable but a beat effect is obtained instead. This is, however, not harmful for the effective operation of the drive system according to the invention.

Figure 2:
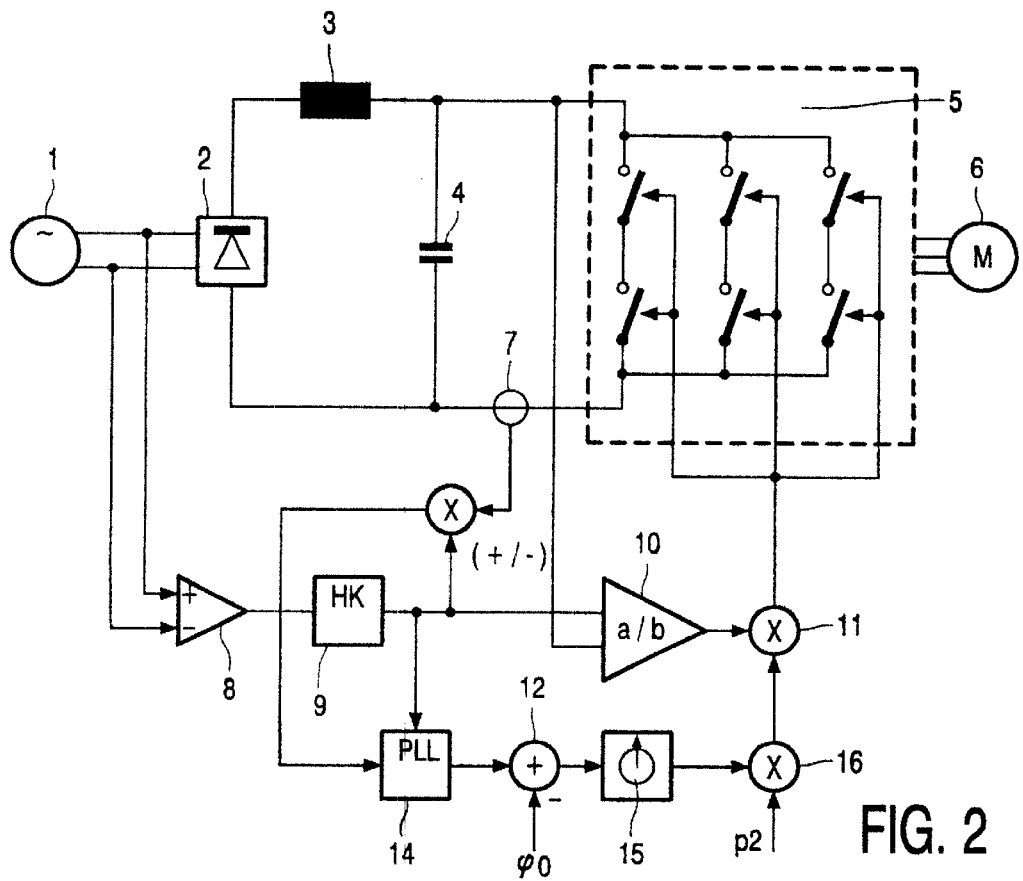
FIG. 2 shows a further arrangement according to the invention, with a mains-synchronous generation of an arbitrary bipolar envelope, compensation of the effect of the intermediate circuit voltage changes on the resultant envelope and automatic adjustment of the frequency in the PLL mode, as well as an externally predetermined value for the power of the drive system.

FIG. 2 is a modification of the embodiment of the drive system shown in FIG. 1, showing a further arrangement according to the invention in which, as distinguished from FIG. 1, the choke (3) is arranged behind the rectifier (2), i.e. in the intermediate circuit of the drive system. The intermediate circuit includes a current measuring element (7) for measuring the current consumption. The output of the current measuring element (7) is coupled to an input of a further multiplication stage whose second input is connected to the output of the envelope generator HK (9). An output of the further multiplication stage is connected to a phase control circuit PLL (14) which also receives the envelope signal as an output signal from the envelope generator HK (9). An output of the phase control circuit PLL (14) is connected to an adder stage (12) in which the output signal of the phase control circuit PLL (14) is additively combined with a signal preferably representing a constant phase shift $\phi_0$ for forming the adjusting value for the frequency (f).

In the drive system shown in the embodiment of FIG. 2, the frequency is adjusted automatically in that the phase control circuit PLL (14) constantly compares the envelope signal with the measuring value of the current in the intermediate circuit and at the static inverter input, supplied from the output of the current measuring element (7), after multiplication by the envelope signal sign supplied from the output of the envelope generator HK (9), and subsequently the frequency of the modulator is adjusted in such a way that an advantageous phase shift $\phi_0$ (supplied as a nominal value via the adder stage (12)) is maintained. The advantageous phase shift is essentially constant in the case of stationary operation of the drive system. Similarly as above, this value may be predetermined by a microcontroller.

Figure 3:
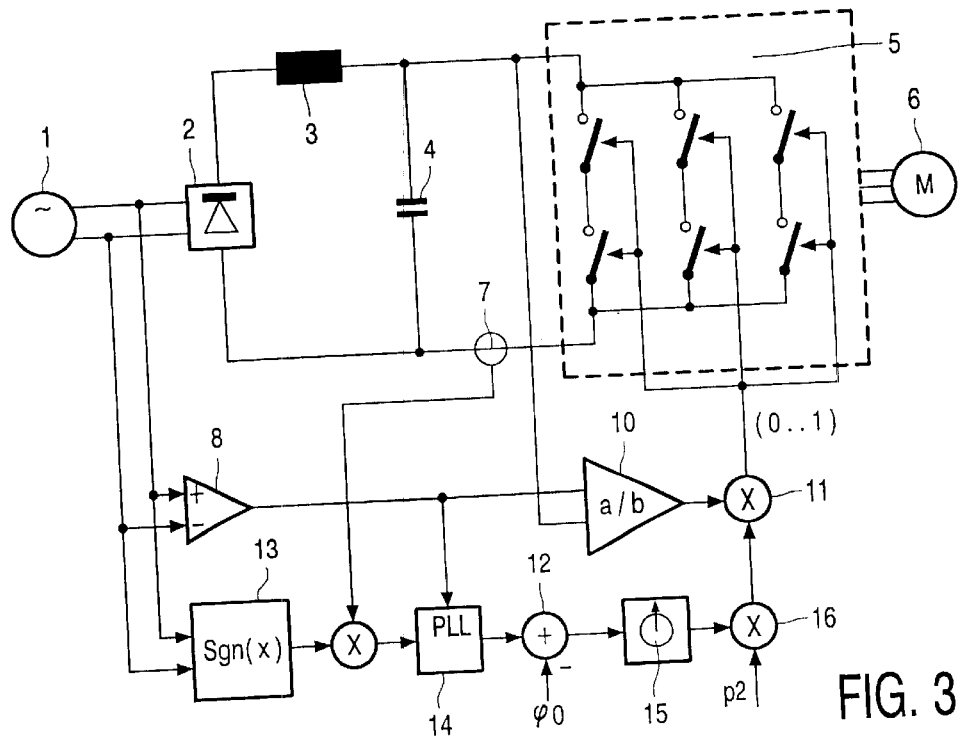
FIG. 3 shows a further arrangement according to the invention, in which the envelope is a projection of the variation of the mains voltage and compensates the effect of the intermediate circuit voltage changes on the resultant envelope, and provides an automatic adjustment of the frequency as well as an externally predetermined value for the power of the drive system.

FIG. 3 shows, as a further version of the embodiment of FIG. 2, a further embodiment of a drive system according to the invention, in which the envelope signal is directly gained from the mains voltage signal of the AC voltage source (1) and in which, accordingly, the measuring value of the current from the current measuring stage (7) is multiplied by the mains voltage sign. To this end, the envelope generator HK (9) of FIG. 2 is replaced by a sign-forming stage (Sgn(x) (13) whose output is connected at the position of the output of the envelope generator HK (9) to the second input of the further multiplication stage. The output of the measuring stage (8) is directly connected to the first input of the division stage (10) and the phase control circuit PLL (14).

Figure 4:
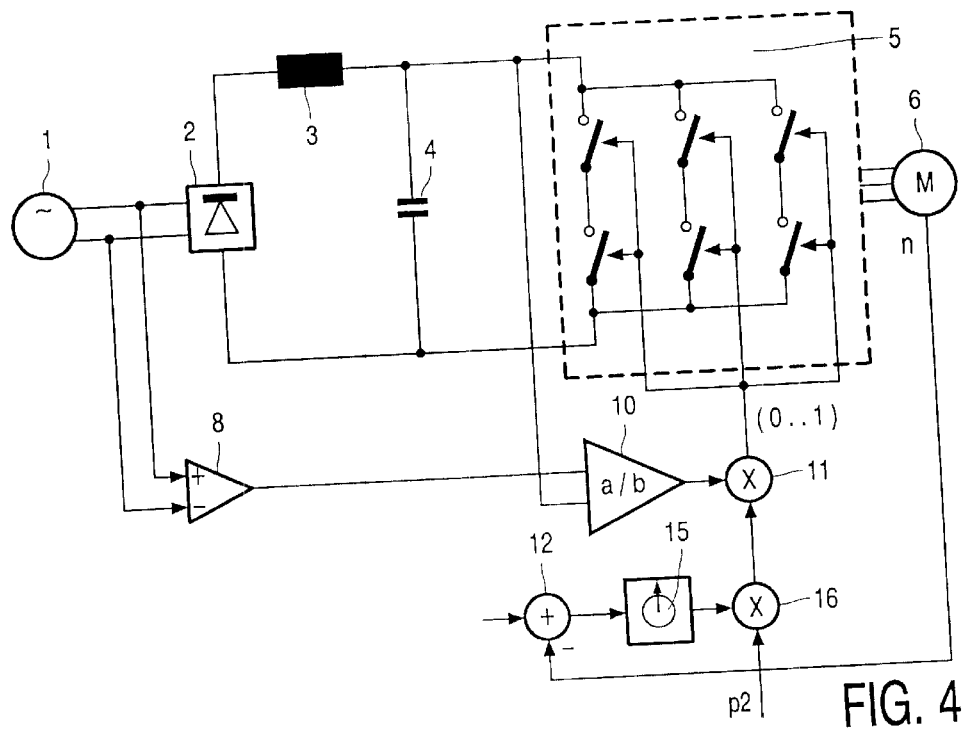
FIG. 4 shows a further arrangement according to the invention, in which the envelope is a projection of the variation of the mains voltage and compensates the effect of the intermediate circuit voltage changes on the resultant envelope, and provides externally predetermined values for the frequency and power of the drive system.
Figure 5:
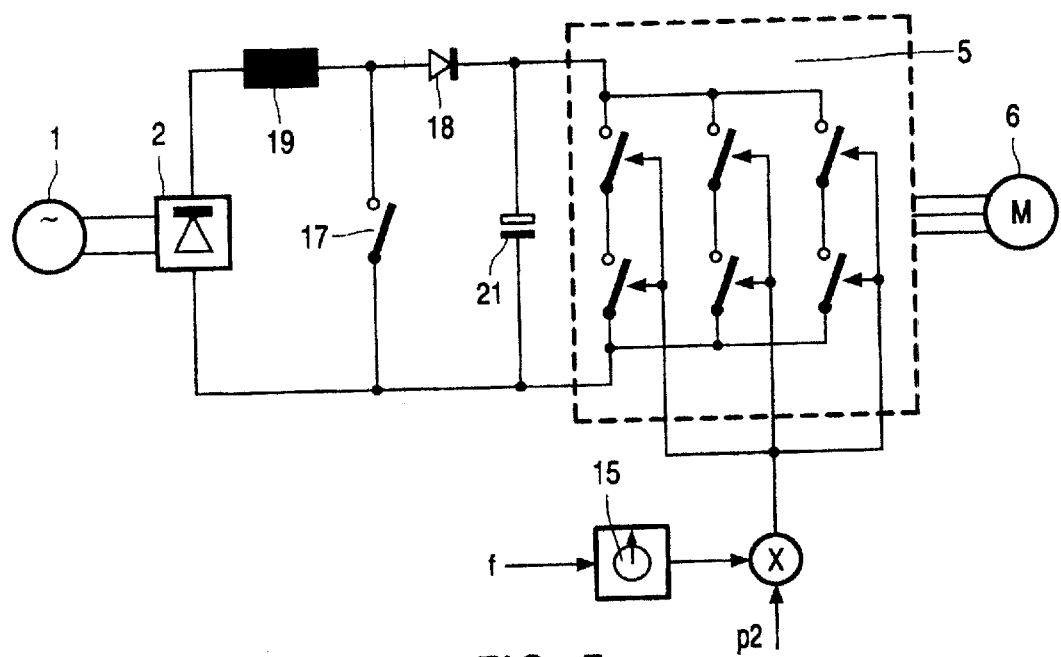
FIG. 5 shows an arrangement representing the state of the art, using a universal up-converter and an energy store.
Figure 6:
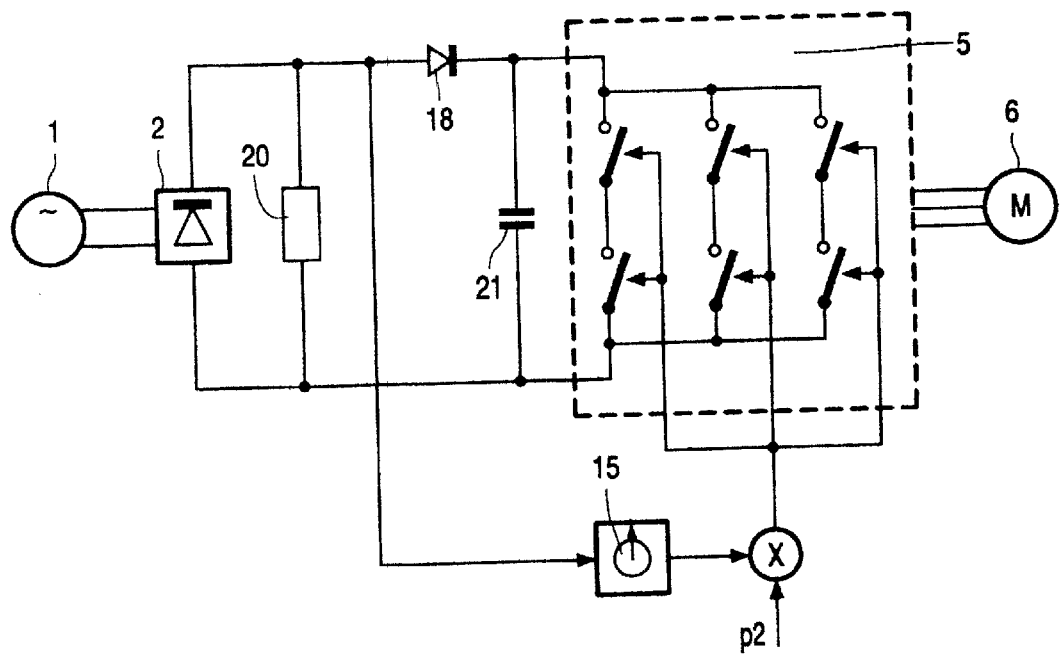
FIG. 6 shows a further arrangement representing the state of the art, using frequency modulation in dependence upon the intermediate circuit voltage.
Figure 7:
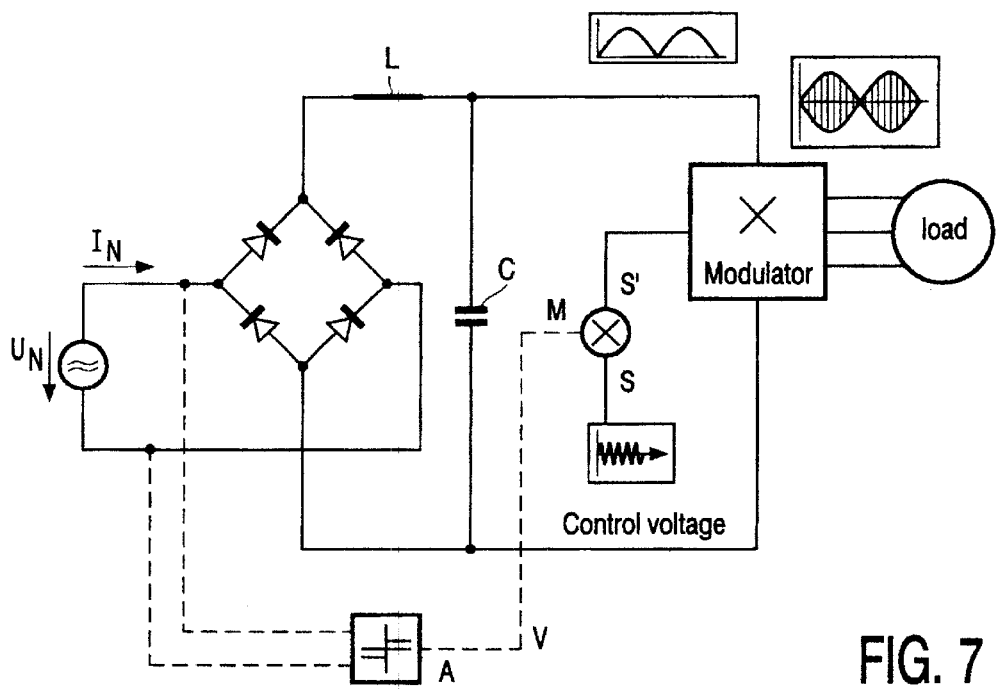
FIG. 7 shows a further arrangement representing the state of the art, using a phase switching (phase jump) of the static inverter control signal in dependence upon the polarity of the mains input voltage.
Figure 8:
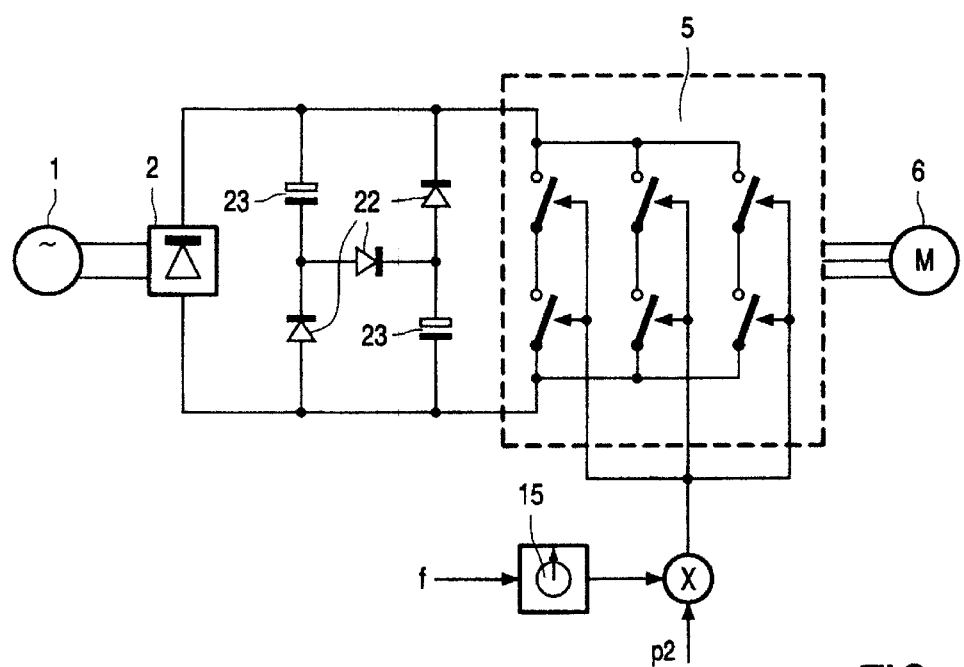
FIG. 8 shows a further arrangement representing the state of the art, using a so-called "Valley-fill" circuit for extending the current flow duration in the single-phase mains.
Figure 9:
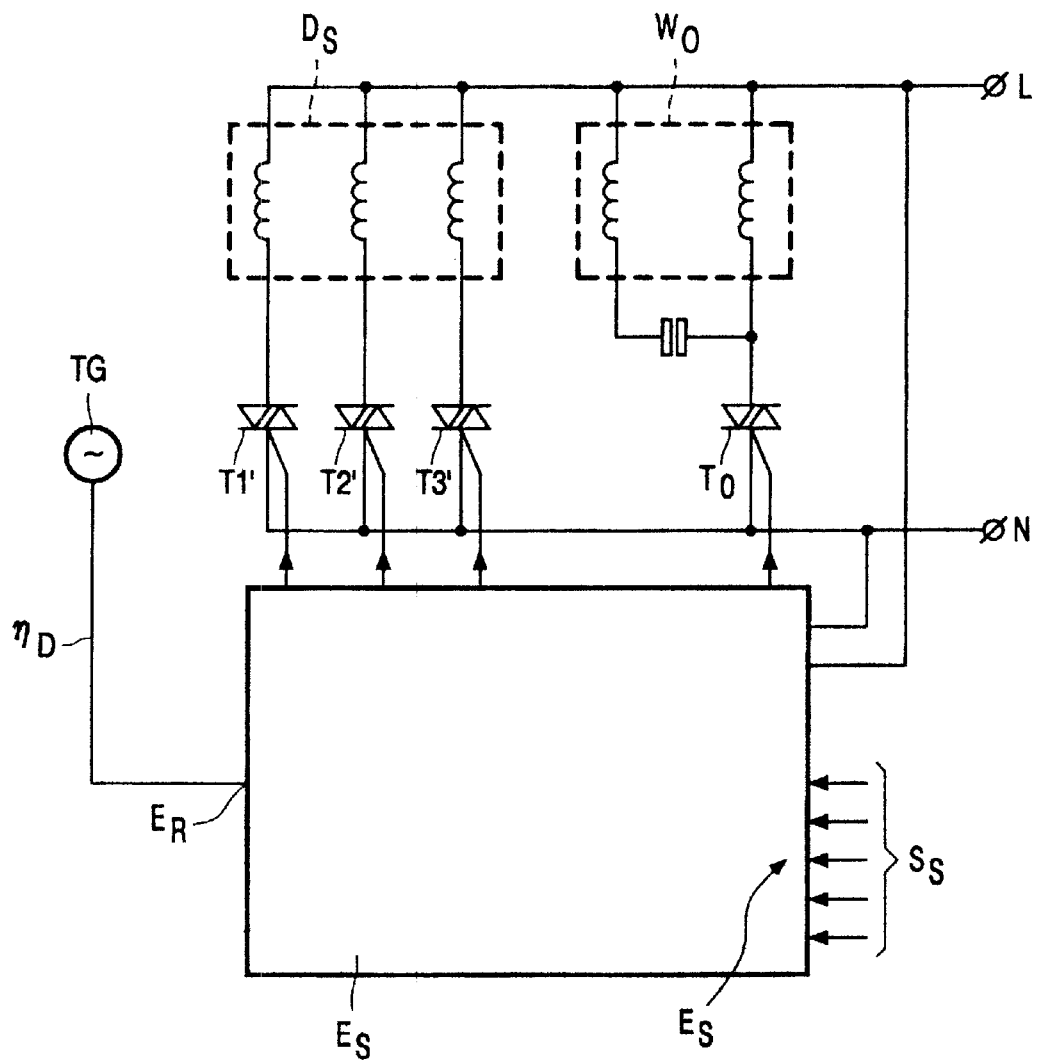
FIG. 9 shows a further arrangement representing the state of the art, using a direct changer circuit.

FIG. 4 shows, as a further modification of the embodiment of FIG. 1, a further embodiment of the drive system according to the invention, in which the suitable frequency is gained in that a predetermined frequency difference is added to the mechanical frequency of the motor (rotational speed×pole pair number). This arrangement does not only comprise the elements shown in FIG. 1 but also the adder stage (12) described with reference to FIG. 2, in which a signal representing the rotational speed of the motor M (6) is additively combined with the signal preferably representing the constant phase shift $\phi_0$ for forming the adjusting value for the frequency (f).

What is claimed is:

1. A the drive system powered by a single-phase alternating current source, comprising
    at least a rectifier,
    a preceding or succeeding filter coil,
    a filter capacitor,
    a static inverter having a variable frequency and an adjustable output voltage amplitude, and
    an induction motor which is fed by the static inverter,
    characterized in that a mains-synchronous envelope generator generates a bipolar signal with which the amplitude of the output voltage of the static inverter is modified in the sense of a sign-multiplication of the original signal, such that the envelope of the voltage at the motor is essentially equal to the signal of the envelope generator, independent of the variation of the actual intermediate circuit voltage.

2. A drive system as claimed in claim 1, characterized in that the instantaneous intermediate circuit voltage is compensated by dividing the envelope signal by an instantaneous value of the intermediate circuit voltage.

3. A drive system as claimed in claim 1 or 2, characterized in that the envelope signal is essentially a sine function.

4. A drive system as claimed in claim 1 or 2, characterized in that the envelope directly corresponds to the variation of the mains voltage.

5. A drive system as claimed in claim 1 or 2, characterized in that the static inverter frequency is automatically controlled in the PLL mode, such that after a multiplication of the sign of the current in the static inverter input by the sign of the envelope signal, a predetermined phase shift is obtained between the current at the static inverter input and the envelope signal.

6. A drive system as claimed in claim 1 or 2, characterized in the static inverter frequency is automatically controlled in that a fixed value is added to the mechanical frequency of the motor.

7. A drive system as claimed in claim 1, characterized in the rectifier comprises bi-directional power-electronic components.

8. The system of claim 5, wherein predetermined phase shift is 0 degrees.

9. A drive system as claimed in claim 3, characterized in that the static inverter frequency is automatically controlled in the PLL mode, such that after a multiplication of the sign of the current in the static inverter input by the sign of the envelope signal, a predetermined phase shift is obtained between the current at the static inverter input and the envelope signal.

10. The system of claim 9, wherein predetermined phase shift is 0 degrees.

11. A drive system as claimed in claim 4, characterized in that the static inverter frequency is automatically controlled in the PLL mode, such that after a multiplication of the sign of the current in the static inverter input by the sign of the envelope signal, a predetermined phase shift is obtained between the current at the static inverter input and the envelope signal.

12. The system of claim 11, wherein predetermined phase shift is 0 degrees.

13. A drive system as claimed in claim 3, characterized in the static inverter frequency is automatically controlled in that a fixed value is added to the mechanical frequency of the motor.

14. A drive system as claimed in claim 4, characterized in the static inverter frequency is automatically controlled in that a fixed value is added to the mechanical frequency of the motor.

15. A drive system of claim 7, wherein the rectifier comprises MOSFET transistors.

16. The drive system of claim 7, wherein the rectifier comprises IGBT transistors with free-wheel diodes.

17. The drive system of claim 1, wherein the static converter is multi-phase.

18. A drive system comprising:
    a single phase alternating current source;
    means for providing an intermediate circuit voltage, comprising:
        a rectifier;
        a filter coil, preceding or succeeding the rectifier;
        a filter capacitor;
    a static inverter, fed by the intermediate circuit voltage and having a variable frequency, for producing an output signal having an adjustable output voltage amplitude;
    an induction motor, fed by the output signal of the static inverter;
    means for creating a mains-synchronous envelope;
    a modulator;
    means for supplying a commutator signal to the static inverter, responsive to the mains-synchronous envelope, the supplying means comprising:
        means for producing a correction signal, responsive to an input signal derived from the intermediate circuit voltage,
        means for sign-multiplying the correction signal with an output of the modulator, the correction signal being such that the output signal of the static inverter has an envelope essentially equal to the mains-synchronous envelope, independent of the variation of the intermediate circuit voltage.

19. The system of claim 17, wherein
    the means for supplying a mains-synchronous envelope supplies a bipolar signal; and
    the means for producing a correction signal comprises means for dividing the bipolar signal by the intermediate circuit voltage in order to create the correction signal.

* * * * *